US006667965B1

(12) United States Patent
Yamaura et al.

(10) Patent No.: US 6,667,965 B1
(45) Date of Patent: Dec. 23, 2003

(54) COMMUNICATION METHOD, TRANSMISSION POWER CONTROL METHOD AND MOBILE STATION

(75) Inventors: Tomoya Yamaura, Tokyo (JP); Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/356,363

(22) Filed: Jul. 19, 1999

(30) Foreign Application Priority Data

Jul. 22, 1998 (JP) .......................................... P10-206287

(51) Int. Cl.$^7$ .............................................. H04B 7/212
(52) U.S. Cl. ........................... 370/347; 455/69; 455/522
(58) Field of Search .......................... 455/69, 522, 68, 455/67.1, 70, 63; 370/347

(56) References Cited

U.S. PATENT DOCUMENTS

| | | | | |
|---|---|---|---|---|
| 5,301,364 A | * | 4/1994 | Arens et al. ................... | 455/69 |
| 5,564,074 A | * | 10/1996 | Juntti ......................... | 455/67.1 |
| 5,590,409 A | * | 12/1996 | Sawahashi et al. ........... | 455/69 |
| 5,794,129 A | * | 8/1998 | Komatsu ..................... | 455/69 |
| 6,041,081 A | * | 3/2000 | O et al. ...................... | 375/297 |
| 6,253,092 B1 | * | 6/2001 | Nguyen et al. .............. | 455/522 |

* cited by examiner

Primary Examiner—William Trost
Assistant Examiner—Nghi H. Ly
(74) Attorney, Agent, or Firm—Jay H. Maioli

(57) ABSTRACT

A communication is method in which communication is carried out between a base station and a mobile station by using a TDMA scheme, that is, the mobile station estimates quality of a received signal by taking a time slot as a unit, from a received signal in a time slot taken as the unit. In the case where the received signal quality estimated by taking a time slot as the unit is larger than a predetermined transmission power, the mobile station conducts transmission processing in a transmission time slot interval, with transmission power smaller in value than the predetermined transmission power by a difference value between the estimated received signal quality and the predetermined transmission power, while in the case where the received signal quality estimated by taking a time slot as the unit is smaller than the predetermined transmission power, the mobile station conducts transmission processing in a transmission time slot interval, with transmission power larger in value than the predetermined transmission power by a difference value between the predetermined transmission power and the estimated received signal quality, whereby the transmission power in each time slot interval can be properly controlled based upon the practical received signal quality.

10 Claims, 5 Drawing Sheets

COMMUNICATION METHOD, TRANSMISSION POWER CONTROL METHOD AND MOBILE STATION

BACKGROUND OF THE INVENTION

1. Field of the Invention

The present invention relates to a communication method and a transmission power control method in digital radio communication, which are suitable for application to a radio communication system using the TDMA scheme, such as a radio telephone system, and relates to mobile stations using such a communication method.

2. Description of the Related Art

Heretofore, the TDMA (Time Division Multiple Access) scheme has been put to practical use as a communication scheme applied to a radio telephone system or the like. In this scheme, one frame is formed of a plurality of time slots. By using an arbitrary time slot in one frame, communication is conducted. In the TDMA scheme, by using one transmission channel, multiple communication up to the number of time slots forming one frame can be conducted at maximum.

In a communication system using this TDMA scheme as well, it is necessary to properly control transmission power from each station in the same way as other communication schemes, in order to improve the frequency utilization efficiency and minimize the interference on communication of other stations. As transmission power control processing in a conventional communication system using the TDMA scheme, only the so-called closed-loop transmission power control for setting the transmission power at each mobile station on the basis of control effected from, for example, a base station was conducted.

However, the closed-loop transmission power control which was conducted in conventional communication of the TDMA scheme uses a control loop which is comparatively slow in response. Its control range is also narrow. The conventional processing is insufficient in all of frequency, precision, and control range of transmission power control. It cannot be said that interference on other communication is suppressed to a level of the lowest limit.

Heretofore, the CDMA (Code Division Multiple Access) scheme has been developed as a communication scheme for conducting transmission power control of comparatively high precision. In the case of this CDMA scheme, however, it was basically premised on the assumption that a mobile station continuously received signals from a base station. It was difficult to apply the CDMA scheme as it was to the TDMA scheme for conducting burst transmission and reception.

SUMMARY OF THE INVENTION

An object of the present invention is to make it possible to conduct transmission power control favorably in the case where communication is conducted by using the TDMA scheme.

In the case where communication is conducted between a base station and a mobile station by using a TDMA scheme, a communication method of the present invention includes the steps, in a mobile station, of: estimating quality of a received signal by taking a time slot as unit, from a received signal in a time slot taken as unit; in response to the received signal quality estimated by taking a time slot as the unit being larger than predetermined transmission power, conducting transmission processing in a transmission time slot interval, with transmission power smaller in value than the predetermined transmission power by a difference value between the estimated received signal quality and the predetermined transmission power; and in response to the received signal quality estimated by taking a time slot as the unit being smaller than predetermined transmission power, conducting transmission processing in a transmission time slot interval, with transmission power larger in value than the predetermined transmission power by a difference value between the predetermined transmission power and the estimated received signal quality.

According to this communication method, transmission power in each time slot interval can be controlled properly on the basis of the actual received signal quality.

In the case where two-way communication is conducted between a first communication station and a second communication station by using a TDMA scheme, a transmission power control method of the present invention includes, as transmission power control in the first communication station, the steps of: receiving a signal transmitted from the second communication station, and estimating quality of a received signal by taking a time slot as unit; in response to the received signal quality estimated by taking a time slot as the unit being larger than predetermined transmission power, conducting processing of transmission to the second communication station in a predetermined time slot interval, with transmission power smaller in value than the predetermined transmission power by a difference value between the estimated received signal quality and the predetermined transmission power; and in response to the received signal quality estimated by taking a time slot as the unit being smaller than predetermined transmission power, conducting processing of transmission to the second communication station in a predetermined time slot interval, with transmission power larger in value than the predetermined transmission power by a difference value between the predetermined transmission power and the estimated received signal quality.

According to this transmission power control method, the transmission power in the first communication station can be controlled properly on the basis of actual reception quality of a signal transmitted from the second communication station.

Furthermore, a mobile station of the present invention includes: an estimation means for estimating quality of a received signal by taking a time slot as unit, from a signal received by a reception means by taking a time slot as unit; a comparison means for comparing the received signal quality estimated by the estimation means by taking a time slot as the unit with a first reference value; and a control means, responsive to the received signal quality being larger than the first reference value as a result of comparison conducted in the comparison means, for producing a control signal so as to reduce transmission power by a difference value between the received signal quality and the first reference value, and responsive to the received signal quality being smaller than the first reference value as a result of comparison conducted in the comparison means, for producing a control signal so as to increase transmission power by a difference value between the first reference value and the received signal quality, the transmission power in the transmission means being subjected to variable control according to the control signals.

According to this mobile station, transmission power can be controlled properly on the basis of actual received signal quality of a signal transmitted from the base station.

DESCRIPTION OF THE PREFERRED EMBODIMENTS

Hereafter, an embodiment of the present invention will be described by referring to the accompanying drawings.

Figure 2:
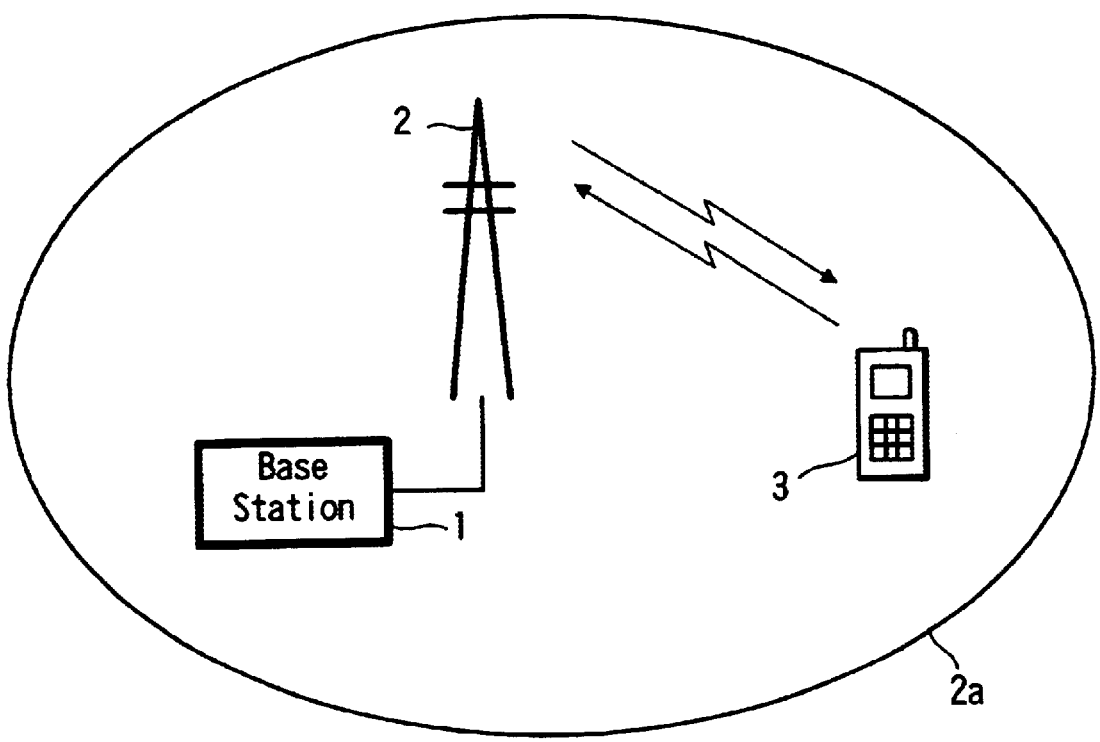
FIG. 2 is a diagram showing an example of a configuration of a communication system according to an embodiment of the present invention.

The present embodiment is an example applied to a radio telephone system of a cellular scheme. In other words, a service area 2a in which radio communication with a base station 1 is possible is formed around an antenna 2 connected to the base station 1 which is disposed in a predetermined state, as shown in FIG. 2. A plurality of such service areas are arranged so as to be contiguous to each other. Service areas of the radio telephone system are thus set in an arbitrary area. By effecting radio communication with the base station 1, a mobile station (terminal device) 3 in the service area 2a can conduct communication via the radio telephone system.

Figure 3:
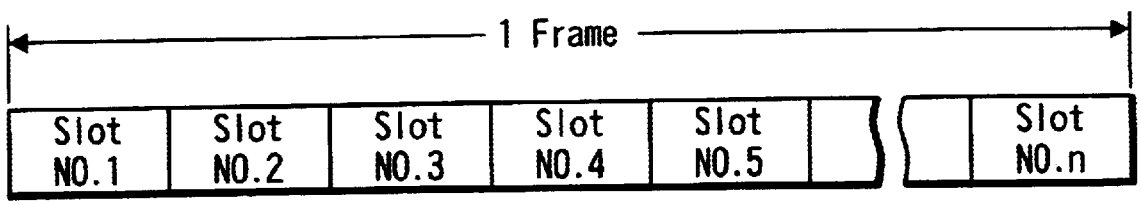
FIG. 3 is a diagram showing an example of a communication state using a TDMA scheme.

The system of the present example has such a configuration that radio communication between the base station 1 and the mobile station 3 is conducted by using the TDMA scheme. In other words, one time slot is defined by a predetermined period of time, for example, as shown in FIG. 3. One frame is formed of n time slots (where n is an arbitrary predetermined number). Such frame is set repetitively. In this case, a frame period is set under the control of the base station, and each mobile station conducts communication by using a time slot assigned under the control of the base station. In the example of FIG. 3, communication is conducted by using different frequency bands (channels) in a down circuit from the base station to the mobile station and in an up circuit from the mobile station to the base station. In this case, a time slot interval during which a signal of the down circuit is received by the mobile station is set basically to the same as a time slot interval during which a signal of the up circuit is transmitted by the mobile station.

Figure 4:
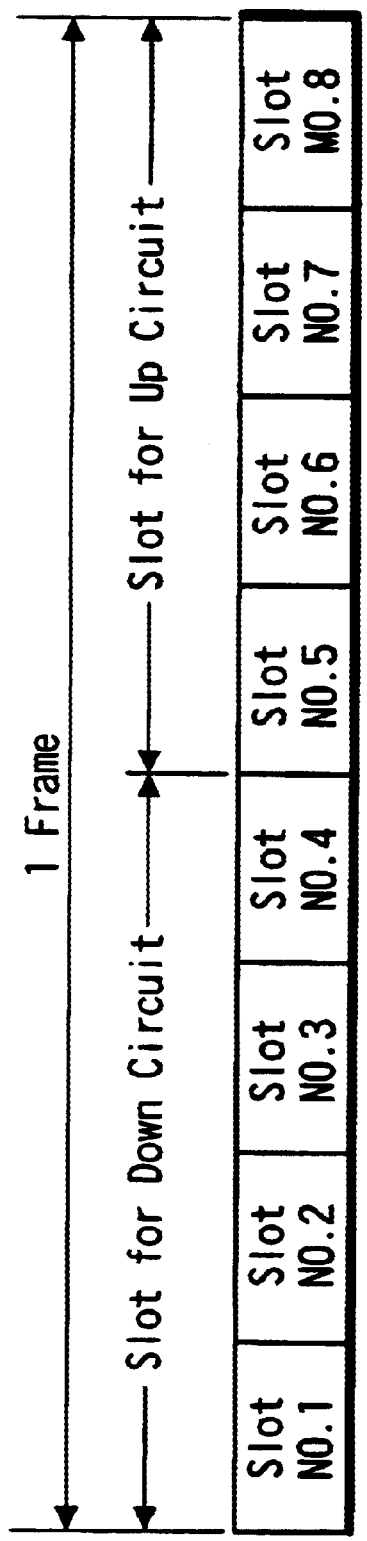
FIG. 4 is a diagram showing an example of a communication state using a TDMA/TDD scheme.

In an alternative configuration, one frame interval is divided into a time slot interval for a down circuit and a time slot interval for an up circuit as shown in FIG. 4. Communication of the up circuit and communication of the down circuit are conducted by using the same channel in a time sharing manner. Communication is thus conducted by using a TDMA/TDD scheme.

Figure 1:
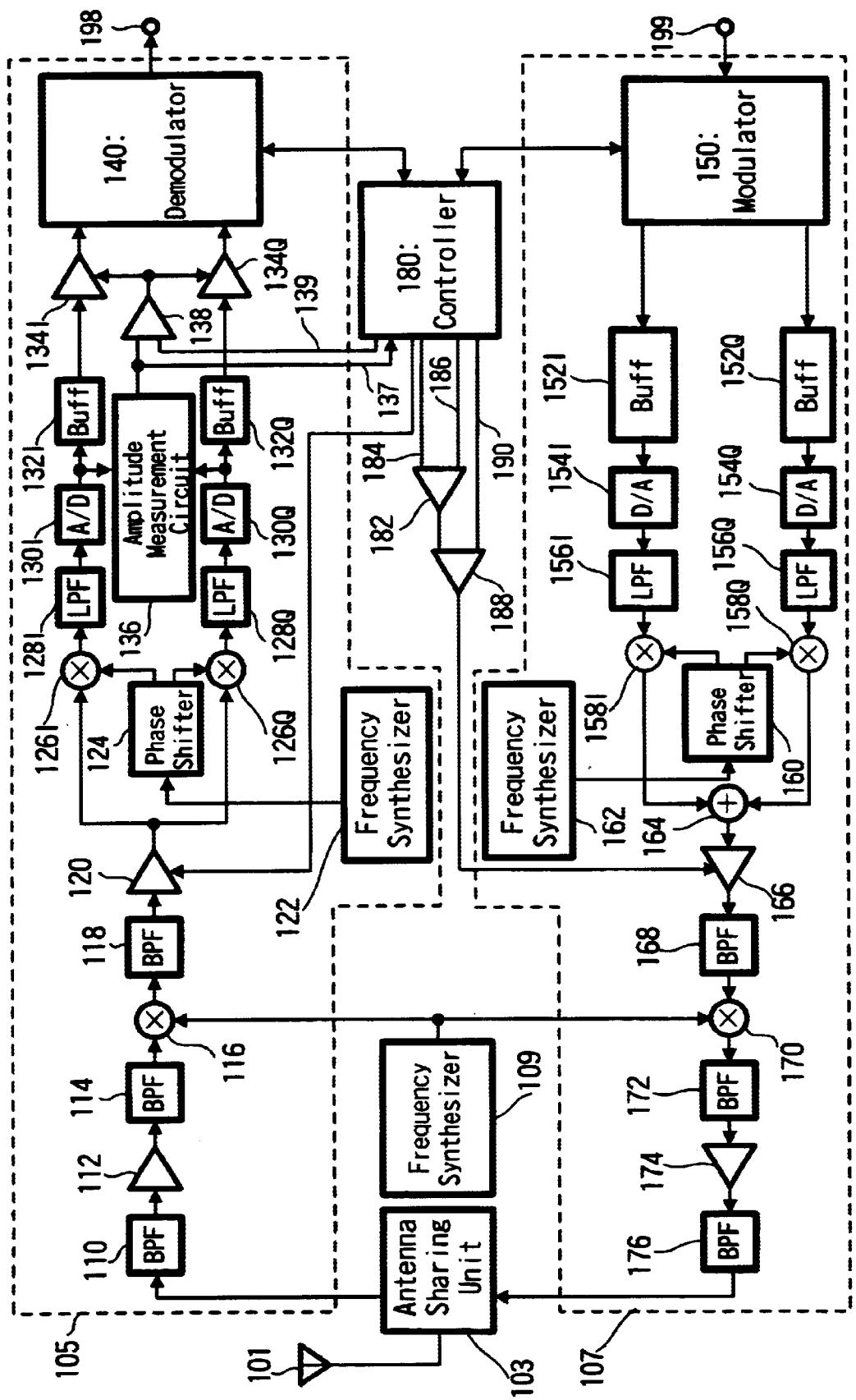
FIG. 1 is a block diagram showing an example of a configuration of a mobile station according to an embodiment of the present invention.

FIG. 1 is a block diagram showing the configuration of the mobile station 3 of the present example. Hereafter, the configuration will be described. An antenna 101 is connected to a receiver 105 via an antenna sharing unit 103. Received data obtained by conducting reception processing on a received signal in the receiver 105 is supplied to a subsequent data processing circuit (not illustrated) via a terminal 198. Transmission data generated by the data processing circuit is supplied to a transmitter 107 via a terminal 199. A high frequency transmission signal generated by this transmitter 107 is supplied to the antenna 101 via the antenna sharing unit 103, and transmitted as a radio wave.

In the receiver 105, a signal supplied from the antenna 101 is supplied to a band-pass filter 110. A signal in a reception band of the system, such as a 2.2 GHz band, is extracted. The extracted output is supplied to a low noise amplifier 112. An amplified output of the low noise amplifier 112 is supplied to a reception mixer 116. In the reception mixer 116, the amplified output of the low noise amplifier 112 is mixed with a signal having a frequency of, for example, 1.8 GHz outputted from a frequency synthesizer 109 to yield an intermediate frequency signal having a predetermined frequency (such as 400 MHz). The intermediate frequency signal outputted from the reception mixer 116 is supplied to an intermediate frequency band-pass filter 118 to extract only a desired reception band. The extracted output is amplified by a reception system gain adjustment circuit 120. A resultant amplified output is supplied to two mixers 126I and 126Q for orthogonal detection. A gain in the gain adjustment circuit 120 is controlled by a controller 180 described later.

From an output of a frequency synthesizer 122, two signals having a phase difference of 90 degrees between them are generated by a phase shifter 124. The two signals are supplied to the mixers 126I and 126Q, respectively. The intermediate frequency signal is converted to baseband signals in the mixers 126I and 126Q. An I component taken out from the mixer 126I is supplied to an analog/digital converter 130I via a low-pass filter 128I, and converted to a digital signal therein. The digital signal is supplied to a gain adjustment digital circuit 134I via a burst buffer 132I, subjected to digital adjustment therein, and then supplied to a demodulator 140. A Q component taken out from the mixer 126Q is supplied to an analog/digital converter 130Q via a low-pass filter 128Q, and converted to a digital signal therein. The digital signal is supplied to a gain adjustment digital circuit 134Q via a burst buffer 132Q, subjected to digital adjustment therein, and then supplied to the demodulator 140.

In the present example, prediction processing of received power is conducted in order to suppress deterioration of the received characteristic. In the case of a communication scheme for receiving continuous signals, control called AGC (automatic gain control) is possible. In the case of the present example, however, burst signals are received by using the TDMA scheme, and hence the prediction processing of the received power becomes necessary. The controller 180 of the mobile station in the present example stores measured results of the received power over several past received slots by taking a time slot as the unit, and predicts received power of the next received slot by using an algorithm including the stored results.

For example, it is now assumed that a running average value is derived over 10 past received slot intervals. It is further assumed that received power measurement values of the 10 past slots with a time slot taken as the unit are −80 dBm, −85 dBm, −90 dBm, −80 dBm, −78 dBm, −75 dBm, −75 dBm, −70 dBm, −70 dBm, and −77 dBm in chronological order. A received power prediction value of the next received slot with a time slot taken as the unit is derived by the following computation: (−80−85−90−80−78−75−75−70−70−77) dBm/10=−78 dBm.

This computation processing is conducted in the controller 180. On the basis of the received power prediction value with a time slot taken as the unit, a gain adjustment in the receiver 105 is conducted. This gain adjustment processing will be now described. It is now assumed that when a signal of −70 dBm is inputted at an input terminal of the antenna 101, the gain of the reception system gain adjustment circuit 120 is set to 0 dB and each of inputs of the analog/digital converters 130I and 130Q is set to become 1 Vrms in that case. Furthermore, with due regard to the prediction error of the received power and variation of the received power caused by fading, a margin of 10 dB is provided.

At this time, the received power prediction value of the next received slot with a time slot taken as the unit is −78 dBm from the above described equation. If the gain of the reception system gain adjustment circuit 120 is set to (−70−(−78))=+8 dB, therefore, a minimum level is obtained. Since the margin has been set to 10 dB here as described above, however, 10 dB is subtracted from +8 dB, and the gain of the reception system gain adjustment circuit 120 is set to resultant −2 dB. Such computation and control processing are executed in the controller 180.

It is now supposed that real power received at the next reception slot is −72 dBm. In this case, each of inputs of the analog/digital converters 103I and 103Q becomes 1 Vrms× 10^(−4/20)=0.631 Vrms. Here, the inputs of the analog/digital converters 103I and 103Q are measured by an amplitude measuring circuit 136. Measured values are supplied to the controller 180 via a signal line 137. In a received slot, $\sqrt{(I^2+Q^2)}$ is computed. Digital measurement is thus conducted to determine that the input signal amplitude corresponds to 0.631 Vrms. This measured value is supplied to the controller 180. The controller 180 knows that the gain of the reception system gain adjustment circuit 120 has been set so that the signal amplitude at this point will become 1 Vrms in the absence of the margin of 10 dB (0.316 Vrms with due regard to the margin of 10 dB) for an input of −72 dBm. Since the measured value is 0.631 Vrms, therefore, it is determined that the signal has been received more intensely than the predicted received power by 20* Log (0.631/0.316)=6 dB. The measurement value of the received power of this received slot with a time slot taken as the unit is calculated to have been [predicted value of −78 dBm]+ [prediction error of +6 dBm]=−72 dBm. The measurement value of the received power of the slot thus calculated is furthermore used as a predicted value of the received power in the next reception slot interval.

On the other hand, it is supposed that the demodulator 140 is optimized at a signal amplitude of 1 Vrms. A digital value corresponding to the reference amplitude value of 1 Vrms is supplied from the controller 180 to a digital computing unit 138 via a signal line 139 as a reference value. The digital computing unit 138 compares the value measured by the amplitude measuring circuit 136 with the reference value, and calculates the ratio of the amplitude to the reference value: 1/1.585, i.e., 20* Log (0.631/1)=−4 dB. The digital computing unit 138 supplies signals for setting the gain of each of the gain adjustment digital circuits 134I and 134Q in the digital domain to +4 dB. Accordingly, the gain of each of the gain adjustment digital circuits 134I and 134Q is made equal to +4 dB so as to make the input amplitude of the demodulator 140 equal to the reference value. By the way, the controller 180 supplies a gate signal indicating burst timing (slot timing) to the amplitude measuring circuit 136, and effects control so that calculation for signal synthesis will be conducted during only a section for receiving the burst signal.

Examples of such processing are summarized in the following table.

TABLE 1

|  | Received signal level | Whether margin is present or not | AGC gain | ADC output amplitude | Digital correction | Demodulator input |
|---|---|---|---|---|---|---|
| Design value of terminal | −70 dBm | absent | 0 dB | 1 Vrms | 0 dB | 1 Vrms |
|  |  | 10 dB | −10 dB | 0.316 Vrms | 10 dB |  |
| In the case of predicted value of −78 dBm input | −78 dBm | absent | +8 dB | 1 Vrms | 0 dB | 1 Vrms |
|  |  | 10 dB | −2 dB | 0.316 Vrms | 10 dB |  |
| In the case where the actual input is −72 dBm in spite of predicted value of −78 dBm | −72 dBm | absent | +8 dB | 2 Vrms | −6 dB | 1 Vrms |
|  |  | 10 dB | −2 dB | 0.631 Vrms | +4 dB |  |

In order to simplify the calculation in the controller 180, calculation is conducted while leaving values in the logarithmic form. However, it is also possible to convert the logarithm values to antilogarithm mW values temporarily, derive an average value, and convert the average value to a logarithm value again. By such processing, the calculation result becomes a slightly different value. Furthermore, if the dynamic ranges of the analog/digital converters 103I and 103Q and the demodulator 140 are sufficient, the gain adjustment processing in the gain adjustment digital circuits 134I and 134Q may be omitted.

By conducting processing as heretofore described, it is possible to conduct automatic gain adjustment operation (AGC operation) based upon the predicted value while taking a time slot as the unit and conduct the measurement of the received power while taking a time slot as the unit.

Transmission processing conducted in the transmitter 107 will be now described. Transmission data obtained at the terminal 199 is supplied to a modulator 150, and subjected to coding for transmission and modulation processing therein. Digital I data and digital Q data for transmission are obtained. The digital I data thus obtained is supplied to a digital/analog converter 154I via a-burst buffer 152I, and converted to an analog I signal therein. Unnecessary components are removed by a low-pass filter 156I, and then a resultant signal is supplied to a mixer 158I for orthogonal modulation. As for the Q channel as well, the digital Q data is supplied to a digital/analog converter 154Q via a burst buffer 152Q in the same way, and converted to an analog Q signal therein. Unnecessary components are removed by a low-pass filter 156Q, and then a resultant signal is supplied to a mixer 158Q for orthogonal modulation.

From a signal having a predetermined frequency, such as a signal of 100 MHz, outputted by a frequency synthesizer 162, two signals having a phase difference of 90 degrees between them are generated by a phase shifter 160. The two signals are supplied to the mixers 158I and 158Q, respectively. An analog I signal and an analog Q signal formed by mixing signals differing in phase are subjected to frequency conversion to yield 100 MHz signals. The 100 MHz signals are combined by an adder 164 to yield one orthogonally modulated signal. An intermediate frequency signal of, for example, 100 MHz is thus obtained. This intermediate frequency signal is subjected to gain adjustment in a reception system gain adjustment circuit 166 under the control of the controller 180, then supplied to a transmission mixer 170 via a band-pass filter 168, mixed with a signal of, for example, 1.8 GHz outputted from the frequency synthesizer 109, and thereby subjected to frequency conversion to yield a transmission RF signal having a frequency band of 1.9 GHz. The frequency-converted transmission signal is supplied to a transmission power amplifier 174 via a band-pass filter 172, subjected to power amplification in the transmission power amplifier 174, supplied to the antenna 101 via a band pass filter 176 and the antenna sharing unit 103, and transmitted as a radio wave.

Transmission power control processing conducted in the transmitter 107 will be hereafter described. It is now temporarily assumed that the transmitter 107 is designed so that when a signal is received at −70 dBm, the gain of the transmission system gain adjustment circuit 166 may be set to 0 dB and a signal may be transmitted from the antenna 101 with power of −10 dBm. Furthermore, in the same way as the foregoing description of the receiver 105, it is assumed that the measurement result of the received power with a time slot taken as the unit is −72 dBm.

At this time, the controller 180 supplies a control signal indicating that a power value to be transmitted is −8 dBm to a computing unit 182 via a signal line 184, and supplies a control signal indicating that the reference of transmission power is −10 dBm to the computing unit 182 via a signal line 186. The computing unit 182 compares them, and adjusts the gain of the transmission system gain adjustment circuit 166 (in the following description, a computing unit 188 and a signal line 190 shown in FIG. 1 are disregarded). In this example, the gain is set to +2 dB. As a result, power of the transmission signal at the antenna 101 becomes −8 dBm.

In this way, transmission power control using so-called open loop involving processing conducted only inside the mobile station is effected. As a result, transmission is automatically conducted with small transmission power in the case where received power is large, whereas transmission is automatically conducted with large transmission power in the case where received power is small.

In the description of the present example, the received signal power itself of a time slot received immediately before a transmission time slot derived by taking a time slot as the unit is used as a parameter for open-loop transmission power control. Alternatively, however, there may be adopted such a configuration that open-loop transmission power control is conducted by using as a parameter an estimated received power value of an average slot derived from a running average value of the received power over a plurality of slots received in past by taking a time slot as the unit. If the example of the predicted power for reception AGC processing of the receiving system described earlier is used as it is, values of the received power of the past 10 slots measured by taking a time slot as the unit are −80 dbm, −85 dbm, −90 dbm, −80 dbm, −78 dbm, −75 dbm, −75 dbm, −70 dbm, −70 dbm, and −77 dbm in order of oldness. It is now assumed that the received power of the immediately preceding received slot with a time slot taken as the unit is derived as −72 dbm. In the case where a running average of 10 slots is used, the value −80 dbm of the received power of the oldest slot with a time slot taken as the unit is discarded. As a running average of remaining 10 slots, a value of −77 dbm is derived by the controller 180.

In this case, the controller 180 supplies a signal indicating that a power value to be transmitted is −3 dbm to the computing unit 182 via the signal line 184, and supplies a signal indicating that the reference of transmission power is −10 dbm to the computing unit 182 via the signal line 186. The computing unit 182 compares them, and adjusts the gain of the transmission system gain adjustment circuit 166. In this example, the gain is set to +7 dB. As a result, the transmission power at the antenna 101 becomes −3 dbm. In the case where a running average is thus used, it becomes difficult to follow an abrupt change, but there is brought about an effect that the influence of errors in a burst measurement can be lightened, and the stability of the system as a whole increases.

Furthermore, there may be adopted such a configuration that open-loop transmission power control is conducted by using not the total received power in a band but a value obtained by subtracting an estimated value of the received power of an interference wave therefrom as a reference. For example, a ratio C/I which is the ratio of the carrier to an interference wave is measured in the receiver 105. An estimated value of the C/I is estimated as 3 dB. In the case where the received power is −72 dbm, a desired wave is easily calculated to be two thirds of the received power and the interference wave and a noise component are easily calculated to be one third of the received power. In the controller 180, the desired received power can be calculated as follows: −72 dbm−1.76 dB=approximately −74 dbm. Such a configuration that the open-loop transmission power control is conducted on the basis of this may also be adopted. In this case, the gain of the transmission system gain adjustment circuit 166 becomes +4 dB. The signal is transmitted from the antenna 101 at −6 dbm.

As far as the description heretofore made, only the so-called open-loop power control has been described. However, closed-loop transmission power control processing may be used together. In the case where the closed-loop power control is conducted, the base station estimates the C/I value of a signal received from each mobile station, and compares it with a reference C/I value. In the case where the estimated C/I value is smaller than the reference C/I value, the base station produces such a closed-loop power control command as to increase the transmission power of the mobile station. In the case where the estimated C/I value is larger than the reference C/I value, the base station produces such a closed-loop power control command as to decrease the transmission power of the mobile-station.

Figure 5:
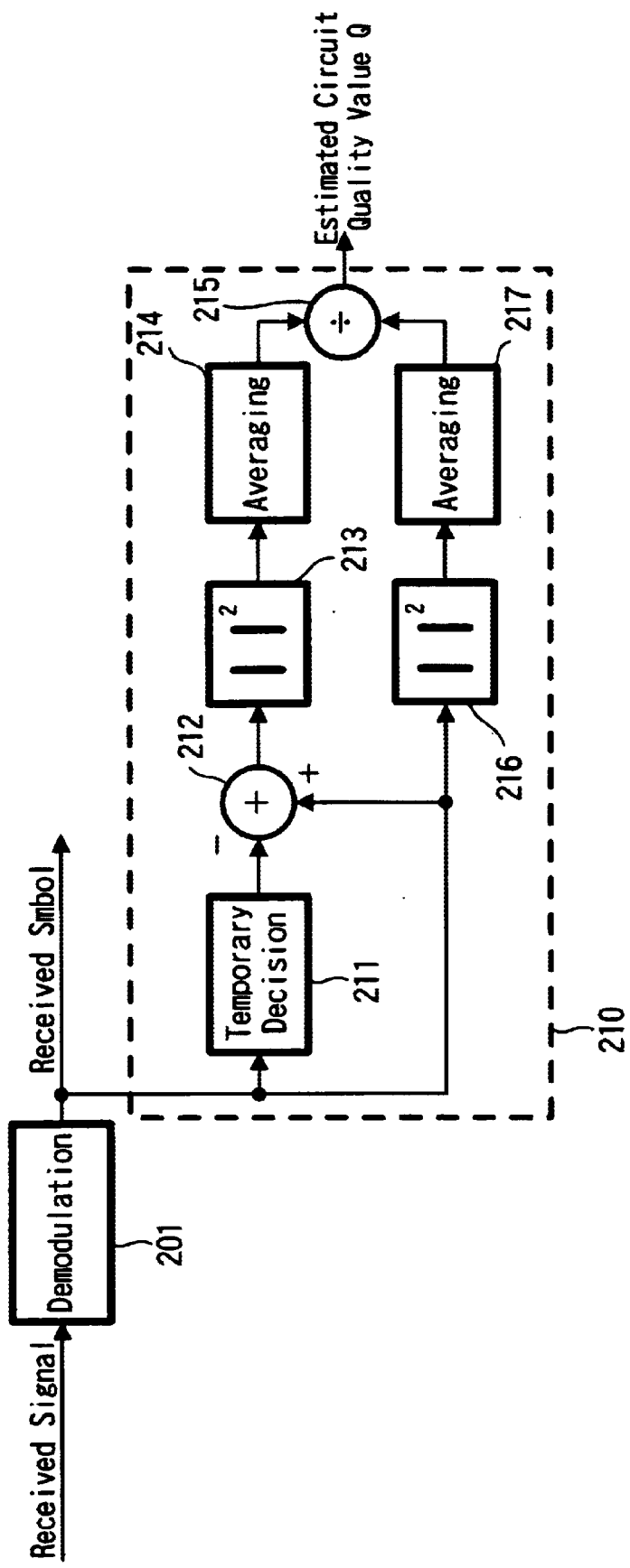
FIG. 5 is a block diagram showing an example of circuit quality estimation processing according to an embodiment of the present invention.
Figure 6:
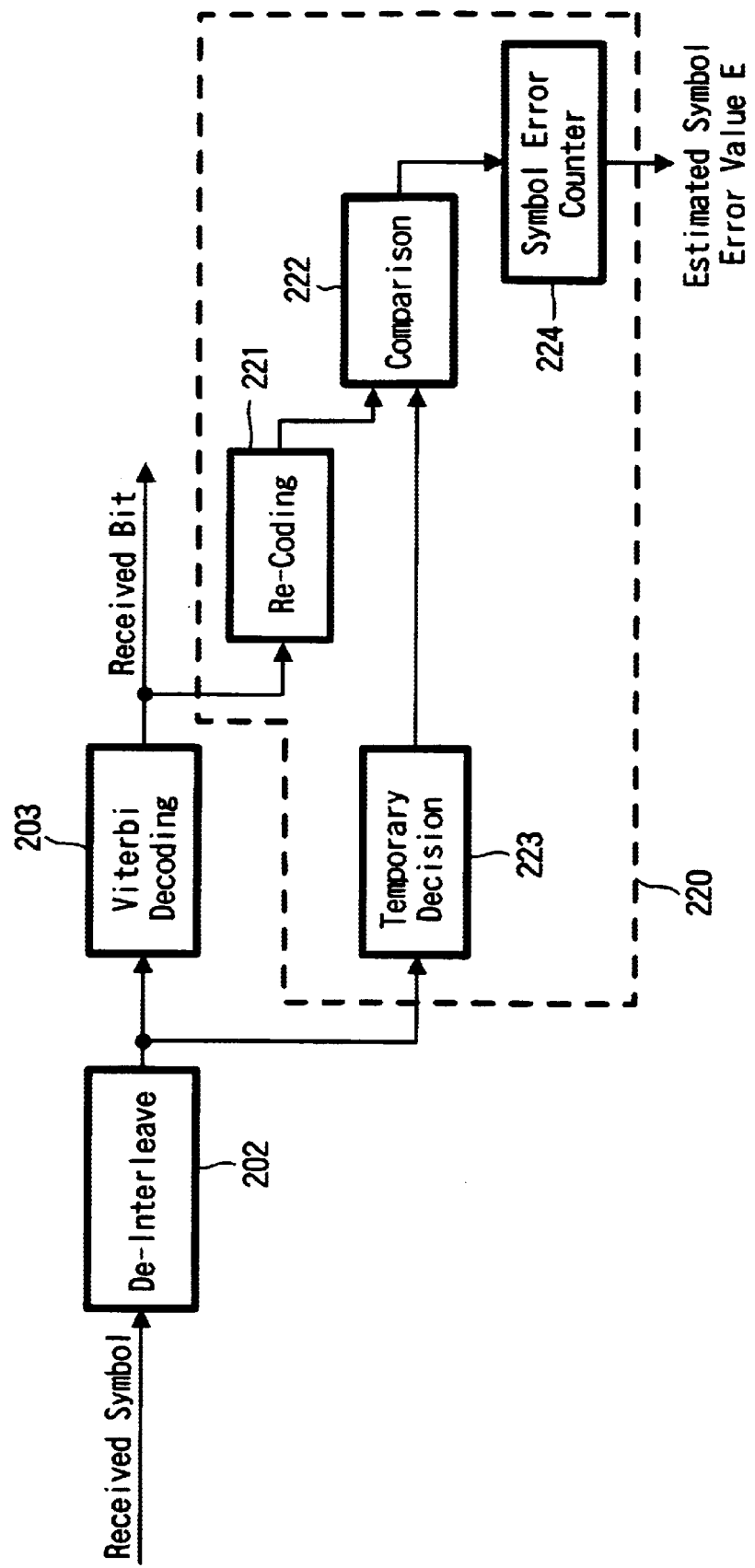
FIG. 6 is a block diagram showing an example of symbol error estimation processing according to an embodiment of the present invention.

FIGS. 5 and 6 show examples of processing for estimating the circuit quality on the base station side.

If in the case where a signal received from each mobile station is demodulated and a received symbol is derived in a demodulator 201 of the reception processing system in the base station it is assumed that the circuit quality is estimated from the received symbol by a circuit quality estimation circuit 210, then the received symbol is supplied to a temporary decision circuit 211, and subjected to temporary decision of the received symbol. A difference between the data subjected to the temporal decision and the received symbol is derived by a subtracter 212. The difference derived here corresponds to the noise component. The difference data is supplied to a squaring circuit 213. Its absolute value is squared. The squared value is supplied to an averaging circuit 214 to derive an average value. Furthermore, the received symbol is supplied directly to a squaring circuit 216. Its absolute value is squared. The squared value is supplied to an averaging circuit 217 to derive an average value. Outputs of the averaging circuits 214 and 217 are supplied to a division circuit 215. The division processing is thus conducted. A resultant quotient is used as an estimated circuit quality value Q. By such processing, an estimated value of noise power and an estimated value of the received power are derived. The C/I value of the received signal can be estimated.

Furthermore, there may be adopted such a configuration that an estimated symbol error value E is derived and a C/I value of a received signal is estimated from the estimated symbol error value E by the configuration as shown in FIG. 6. In other words, for example, a received symbol is subjected to de-interleave processing in a de-interleave circuit 202. Thereafter, the received bit subjected to Viterbi decoding in a Viterbi decoder 203 is supplied to a symbol error estimation circuit 220. In this symbol error estimation circuit 220, the received bit is supplied to a re-coding circuit 221, and supplied to a comparator 222 as a re-coded symbol. Furthermore, the received symbol de-interleaved in the de-interleave circuit 202 is supplied to the comparator 222 via a temporary decision circuit 223. The re-coded symbol is thus compared with the received symbol. In the case where a result of the comparison is not coincident, data indicating non-coincidence is outputted to a symbol error counter 224. The symbol error counter 224 counts the number of data indicating non-coincidence, determines the occurrence rate of symbol errors from the count in a predetermined time, and outputs the determined value as an estimated symbol error value E. This estimated symbol error value can also be used as the C/I value of the received signal. Alternatively, the C/I value of the received signal may be determined from both the estimated circuit quality value Q estimated in the configuration shown in FIG. 5 and the estimated symbol error value E estimated in the configuration shown in FIG. 6.

On the basis of the C/I value of the output received from the mobile station thus determined, a closed-loop control command is produced. The control command is carried by a radio transmission signal of a down circuit for the pertinent mobile station, and transmitted.

Upon receiving the signal, the mobile station extracts the control command in the demodulator 140, and supplies the control command to the controller 180. The controller 180 determines the amount of increase or decrease of the transmission power on the basis of the control command, and supplies its result to a computing unit 188 via a signal line 190 shown in FIG. 1. This computing unit 188 is supplied with an output of the computing unit 182. The computing unit 188 is a circuit for adding the gain derived by the open loop and the gain derived by the closed-loop command and producing a control signal for the transmission system gain adjustment circuit 166. By conducting the gain control of the transmission system gain adjustment circuit 166 by using this control signal, both the open-loop control and the closed-loop control can be used together.

For example, if the power control command derived by the closed loop is −2 dB and the gain control value derived by the open loop using the output of the computing unit 182 is +2 dB, then the gain control value at the output of the computing unit 188 becomes 0 dB which is the sum value.

Furthermore, in the case where a mobile station has a plurality of receivers in order to effect reception diversity, the respective receivers are typically different in measured value of received power with a time slot taken as the unit or in estimated power value of desired received wave with interference power subtracted and with a time slot taken as the unit. In such cases, there are conceivable a case where a maximum received power with a time slot taken as the unit is selected out of them and the above described open-loop power control processing is conducted on the basis thereof, and a case where an average value of received powers of the respective receivers with a time slot taken as the unit is derived and open-loop power control processing is conducted on the basis thereof.

In the case where the maximum received power with a time slot taken as the unit is selected and the open-loop power control processing is conducted, the circuit configuration becomes simple and the transmission power can be made the lowest. As a result, the interference exerted upon other communication signals can be made the minimum. On the other hand, in the case where an average value of received power of the receivers with a time slot taken as the unit is derived and open-loop power control processing is conducted on the basis thereof, the probability that a wave transmitted from the station is received with at least predetermined power by a base station becomes high. Since average processing is conducted, however, the circuit scale becomes slightly larger and there is a possibility that the interference exerted upon other communication signals becomes slightly larger.

Furthermore, there may be adopted such a configuration that the transmission power of the transmission signal of the down circuit transmitted by the base station is also variably set. In the case where the transmission power of the transmission signal of the down circuit is variably set according to the state at that time, however, there is always an offset corresponding to an amount of transmission power changed by the base station, even if the mobile station conducts open-loop power control processing of the up circuit by taking only the received signal power with a time slot taken as the unit, as the reference. In such a case, there is adopted such a configuration that the base station transmits a power value of the transmission signal or data of a difference between the power value and a reference value to the mobile station, and the mobile station extracts it in the demodulator 140 and then supplies it to the controller 180. The controller 180 updates the reference value of the transmission power set by the mobile station according to that data, then supplies the updated reference value to the computing unit 182 via the signal line 186, and causes the open-loop power control processing to be executed. For example, if the mobile station has received data indicating that the transmission power of the base station is +5 dB above the reference value, the reference value of the transmission power is changed in the above described example from the original value of −10 dB to −5 dB. By using this as the reference value, open-loop control processing of the transmission signal power is conducted. By doing so, the received signal power in the base station comes closer to a predetermined value.

In the above described embodiment, the present invention has been applied to a communication system for a radio telephone system. As a matter of course, however, the present invention can also be applied to processing in communication systems to which other TDMA schemes are applied. For example, in the case where two-way radio communication is conducted by using the TDMA scheme between two radio communication apparatuses, the present invention can also be applied to communication processing in each communication apparatus.

Furthermore, the present invention can also be applied to a communication scheme which is different from the pure TDMA scheme as shown in FIGS. 3 and 4, so long as the communication scheme has a time slot structure. For example, the present invention can also be applied to a so-called CDMA hybrid communication scheme such as the TD-CDMA scheme.

Furthermore, in the above described embodiment, communication processing of ordinary TDMA scheme using only restricted time slots, such as one slot of one frame, for communication has been described. However, the present invention can also be applied to such a system as to conduct transmission or reception by using a plurality of slots or all slots included in one frame in order to increase the rate of transmitted data, and mobile stations used for that system.

According to a communication method stated in the present invention, transmission power in each time slot interval can be controlled properly on the basis of the actual received signal quality. As a result, the frequency utilization efficiency of a system can be improved.

Further, as the received signal quality estimated by the mobile station by taking a time slot as the unit in the invention stated in claim 1, a value of received signal power estimated by taking a time slot as the unit is used. As a result, the transmission power can be controlled favorably in the mobile station on the basis of the estimated value of the received signal power.

Further, there is used a value of desired received signal power estimated by taking a time slot as the unit which is obtained by subtracting a value of interference power in a received signal band estimated by taking a time slot as the unit from a value of received signal power estimated by taking a time slot as the unit. As a result, accurate transmission power control can be conducted in the mobile station without being influenced by an interference wave.

Furthermore, the base station conducts transmission power control, and in addition transmits its transmission power value or a difference value between a reference value and the transmission power value to the mobile station, and upon receiving this value, the mobile station updates the predetermined transmission power value on the basis of the transmission power value or the difference value. As a result, favorable transmission power control can be conducted in the mobile station by using the value transmitted from the base station.

Also, the base station receives a signal transmitted by the mobile station, estimates its circuit quality, generates and transmits transmission power control data based upon the estimated value, and the mobile station conducts transmission power control based upon the estimated value of the received signal quality and, in addition, conducts closed-loop transmission power control based upon the received transmission power control data. As a result, more favorable transmission power control using both transmission power control of a so-called open-loop form and transmission power control of a so-called closed-loop form can be conducted.

According to a mobile station of the present invention, the transmission power can be controlled properly on the basis of the actual received signal quality of a signal transmitted from the base station. The frequency utilization efficiency in the communication system having the mobile station can be improved. In addition, due to decrease of average transmission power in the mobile station, the life of a battery provided in the mobile station can be prolonged. The time during which communication can be conducted (the time during which call can be made) can be prolonged.

Further, as the received signal quality estimated by the estimation means by taking a time slot as the unit, a value of received signal power estimated by taking a time slot as the unit is used. As a result, favorite transmission power control based upon the estimated value of the received signal power can be conducted.

Further, the reception means includes an analog-digital conversion means for converting a received signal to a digital signal; a gain adjustment means disposed in a stage preceding the analog-digital conversion means; a reception gain control means for predicting a received power level in next received slot on the basis of results of received power measurement over a plurality of past slots, and controlling the gain adjustment means on the basis of a result of the prediction; and a digital gain adjustment means for measuring a signal amplitude of the digital signal converted by the analog-digital conversion means, comparing a value thus measured with a preset optimum received. signal amplitude, and adjusting the signal amplitude by a difference between the measured value and the preset optimum received signal amplitude. As a result, receiving processing can be conducted favorably by both gain adjustments before and after the analog-digital conversion.

Further, as processing for estimating the received signal quality by taking a time slot as the unit, the estimation means estimates the received signal quality on the basis of received power of a received slot received by the reception means at timing nearest to a transmission slot transmitted by the transmission means. As a result, suitable transmission power setting based upon the latest receiving state can be conducted.

Also, as the received signal quality estimated by the estimation means by taking a time slot as the unit, there is used a running average value of received power of a plurality of past received slots received by the reception means. As a result, suitable transmission power setting based upon the average of past values can be conducted.

Further, as the received signal quality estimated by the estimation means by taking a time slot as the unit, there is used a value of desired received signal power estimated by taking a time slot as the unit which is obtained by subtracting a value of interference power in a received signal band estimated by taking a time slot as the unit from a value of received signal power estimated by taking a time slot as the unit. As a result, suitable transmission power setting can be conducted without being influenced by the interference wave.

Also, the control means conducts transmission power control based upon the value of the received signal quality estimated by the estimation means, and in addition, conducts closed-loop transmission power control based upon transmission power control data transmitted from the base station and received by the reception means. As a result, more favorable transmission power control using both transmission power control of a so-called open-loop form and transmission power control of a so-called closed-loop form can be conducted.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A communication method of a TDMA scheme for conducting communication between at least one base station and a plurality of mobile stations by using an arbitrary time slot included in a frame period composed of a plurality of time slots, the communication method in a mobile station comprising the steps of:

estimating a quality of a received signal by taking a time slot as a unit, from a received signal in a time slot taken as a unit;

upon determining that the received signal quality estimated by taking a time slot as the unit is larger than a predetermined transmission power, conducting transmission processing in a transmission time slot interval with a transmission power smaller in a value than the predetermined transmission power by a difference value between the estimated received signal quality and the predetermined transmission power; and upon determining that the received signal quality estimated by taking a time slot as the unit is smaller than a predetermined transmission power, conducting transmission processing in a transmission time slot interval with a transmission power larger in value than the predetermined transmission power by a difference value between the predetermined transmission power and the estimated received signal quality.

2. The communication method according to claim 1, wherein as the received signal quality estimated by the mobile station by taking a time slot as the unit, using a value of received signal power estimated by taking a time slot as the unit.

3. The communication method according to claim 1, wherein as the received signal quality estimated by the mobile station by taking a time slot as the unit, using a value of desired received signal power estimated by taking a time slot as the unit which is obtained by subtracting a value of interference power in a received signal band estimated by taking a time slot as the unit from a value of received signal power estimated by taking a time slot as the unit.

4. The communication method according to claim 1, wherein the base station conducts transmission power control and transmits the base station transmission power value or a difference value between a reference value and the transmission power value to the mobile station, and upon receiving this value causes the mobile station to update the predetermined transmission power value on the basis of the transmission power value or the difference value.

5. The communication method according to claim 1, wherein the base station receives a signal transmitted by the mobile station, estimates a signal quality thereof, compares a value thus estimated with a predetermined reference value, generates transmission power control data of the mobile station according to a resultant magnitude relation, and transmits the transmission power control data, and the mobile station conducts transmission power control based upon the estimated value of the received signal quality and conducts closed-loop transmission power control based upon the received transmission power control data.

6. A transmission power control method for controlling transmission power at a first communication station, when two-way communication is conducted in a TDMA scheme by using an arbitrary time slot included in a frame period composed of a plurality of time slots between the first communication station and a second communication station, in the first communication station the transmission power control method comprising the steps of:

receiving a signal transmitted from the second communication station and estimating a quality of a received signal by taking a time slot as a unit;

upon determining that the received signal quality estimated by taking a time slot as the unit is larger than a predetermined transmission power, conducting processing of transmission to the second communication station in a predetermined time slot interval, with a transmission power smaller in value than the predetermined transmission power by a difference value between the estimated received signal quality and the predetermined transmission power; and upon determining that the received signal quality estimated by taking a time slot as the unit is smaller than the predetermined transmission power, conducting processing of transmission to the second communication station in a predetermined time slot interval, with transmission power larger in value than the predetermined transmission power by a difference value between the predetermined transmission power and the estimated received signal quality.

7. The transmission power control method according to claim 6, wherein as the received signal quality estimated by the first communication station by taking a time slot as the unit, using a value of received signal power estimated by taking a time slot as the unit.

8. The transmission power control method according to claim 6, wherein as the received signal quality estimated by the first communication station by taking a time slot as the unit, using a value of desired received signal power estimated by taking a time slot as the unit which is obtained by subtracting a value of interference power in a received signal band estimated by taking a time slot as the unit from a value of received signal power estimated by taking a time slot as the unit.

9. The transmission power control method according to claim 6, wherein the second communication station conducts transmission power control and transmits a transmission power value or a difference value between a reference value and the transmission power value to the first communication station, and upon receiving this value the first communication station updates the predetermined transmission power value on the basis of the transmission power value or the difference value.

10. The transmission power control method according to claim 6, wherein the second communication station receives a signal transmitted by the first communication station, estimates a circuit quality thereof, compares an estimated value with a predetermined reference value, generates transmission power control data of the first communication station according to a resultant magnitude relation, and transmits the transmission power control data, and the first communication station conducts transmission power control based upon the estimated value of the received signal quality and conducts closed-loop transmission power control based upon the received transmission power control data.

* * * * *